April 20, 1926.

C. R. WELSH

INSECT OR VERMIN TRAP OR DESTROYER

Filed July 1, 1925

1,581,410

Inventor:
Charles R. Welsh,
by Joseph W. Harris
Att'y.

Patented Apr. 20, 1926.

1,581,410

UNITED STATES PATENT OFFICE.

CHARLES R. WELSH, OF HONOLULU, TERRITORY OF HAWAII.

INSECT OR VERMIN TRAP OR DESTROYER.

Application filed July 1, 1925. Serial No. 40,810.

*To all whom it may concern:*

Be it known that I, CHARLES R. WELSH, a citizen of the United States, and residing at Honolulu, in the county of Honolulu and Territory of Hawaii, have invented certain new and useful Improvements in Insect or Vermin Traps or Destroyers, of which the following is a specification.

This invention relates to insect or vermin traps, or destroyers, and has for an object to provide a means to either trap or destroy insects that may attempt to pass over it.

A further object is to provide a means that will prevent the passage of an insect;

A further object is to provide a simple trap, that may be cleaned, that is sanitary, and that is cheap to manufacture.

In the accompanying drawings.

Figure 1:
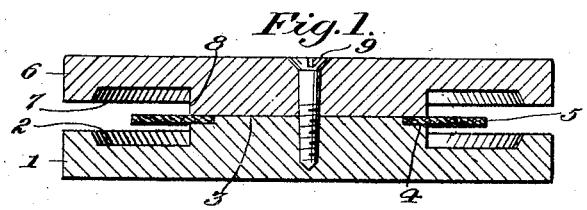
Figure 1 is a cross-sectional view of one form of the trap.

In Fig. 1, a disc 1 of wood, metal or cardboard, or other suitable material, preferably circular in shape, is provided, with a recessed portion 2 and a central hub 3; the hub may be provided with a shouldered end 4, upon which is placed a disc of paper 5, or similar material, coated with insect poison or adhesive, or other suitable insecticide, such as is used on sticky fly paper, etc. Above the disc 1 is a cover disc 6, having a recessed portion 7, and a central hub 8, which is secured to the lower disc 1 either by a screw 9 or other suitable means, or it may be permanently fastened with glue, or riveted or otherwise.

In the assembly of the trap, the paper disc 5 is placed on the shoulder 4 and the upper and lower discs united.

The assembled discs provide an annular chambered support with an insecticide carrier supported in the chamber but spaced from its walls.

Figure 2:
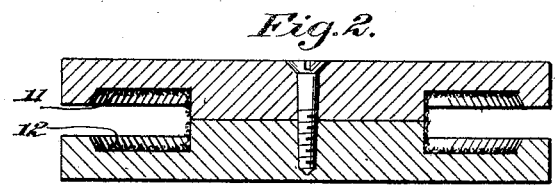
Fig. 2 is a cross-sectional view of a modification.
Figure 3:
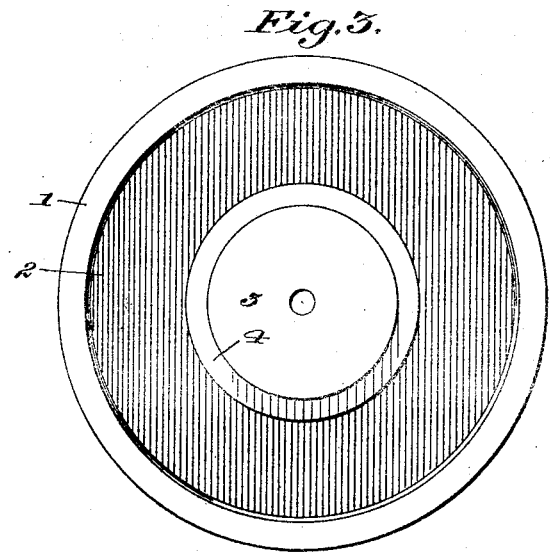
Fig. 3 is a plan view of the inner side of the lower part of Fig. 1.
Figure 4:
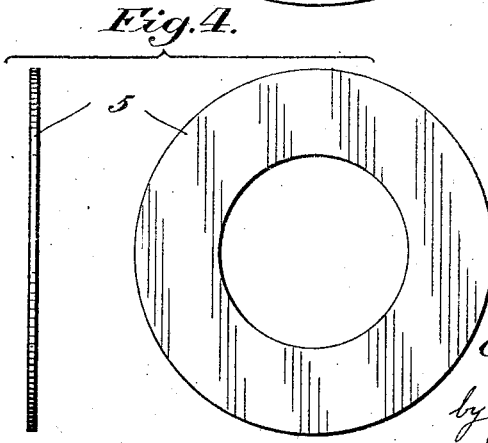
Fig. 4 is a plan and edge view of a perforated disc of paper or other material upon which the vermin poison or adhesive is placed.

In the modification shown in Fig. 2, the insect poison or adhesive is coated upon the surfaces of the recesses, as at 11 and 12, and the discs united.

In use, the trap consists of the united discs, which may be placed on a shelf, or table, and upon it, a dish or other receptacle containing food may be placed. Insects, such as ants, water bugs, etc., attempting to reach the food will be obliged to cross the layer of insect poison or adhesive in the trap, and will be trapped or destroyed thereby. The dead insects will be retained in the recess in the trap, from which they may be periodically removed.

The trap may also be placed under the castors of beds or other articles of furniture, where it will prevent insects from travelling from the floor to the furniture.

The paper disc 5 is spaced from the supporting upper and lower discs, and provides a carrier for the adhesive or poison that is removable, and that may be replaced when desired.

I claim:

1. An insect trap which comprises spaced supporting discs, and an insecticide carrier centrally supported and projecting radially from the central support.

2. An insect trap comprising an annular chambered support, and an insecticide carrier supported within the annular chamber, and spaced from the walls thereof.

3. An insect trap comprising spaced supporting discs, recesses in said discs, and an insecticide therein and spaced from the lower disc.

4. An insect trap comprising separable discs, an annular chamber extending from the edge of the trap, an insecticide therein located upon an upper surface in the chamber, and means to detchably unite the separable discs.

In testimony whereof I hereby affix my signature.

CHARLES R. WELSH.